H. W. BALTZ, Sr.
Velocipede.
No. 212,884. Patented Mar. 4, 1879.
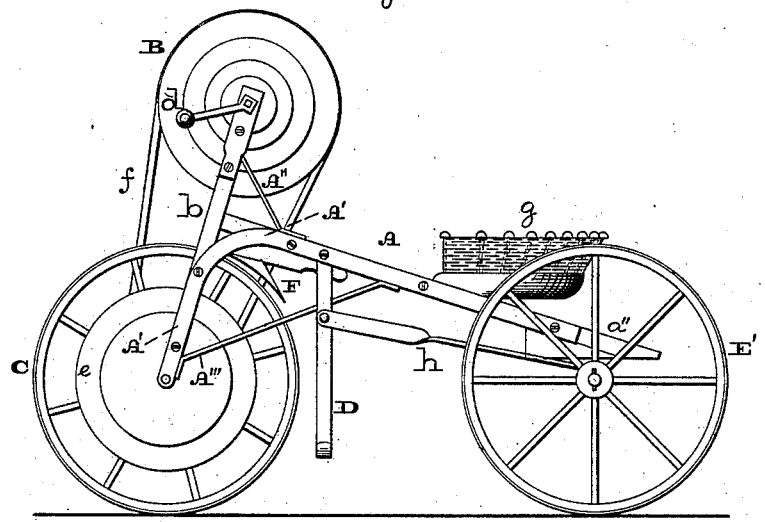
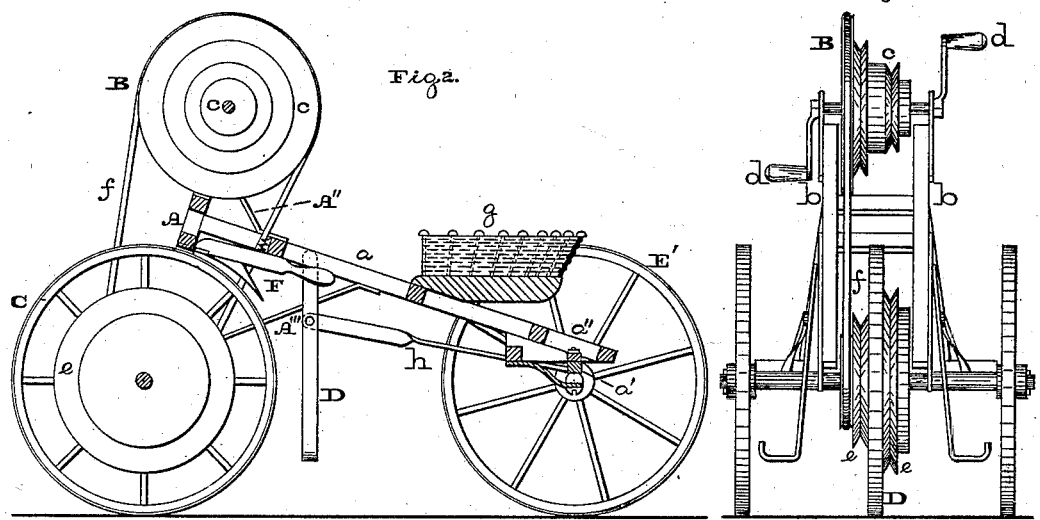
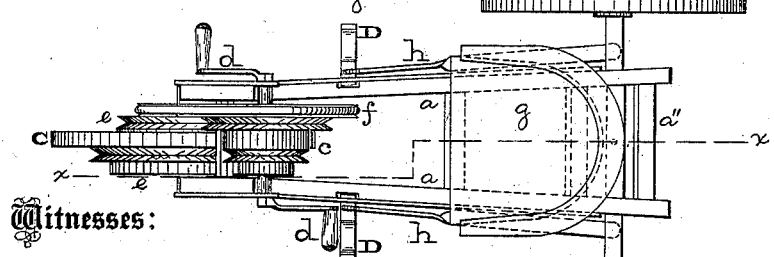
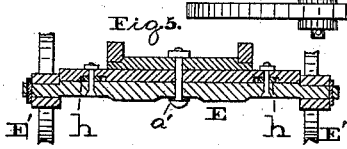

UNITED STATES PATENT OFFICE.

HENRY W. BALTZ, SR., OF PHILADELPHIA, PENNSYLVANIA.

IMPROVEMENT IN VELOCIPEDES.

Specification forming part of Letters Patent No. 212,884, dated March 4, 1879; application filed January 3, 1879.

*To all whom it may concern:*

Be it known that I, HENRY W. BALTZ, Sr., of the city and county of Philadelphia, and State of Pennsylvania, have invented a new and useful Improvement in Velocipedes or Land-Propellers, which improvement is fully set forth in the following specification and accompanying drawings, in which—

Figure 1 is a side elevation of the land-propeller embodying my invention. Fig. 2 is a longitudinal vertical section thereof in line $x$ $x$, Fig. 4. Fig. 3 is a front view thereof. Fig. 4 is a top or plan view thereof. Fig. 5 is a vertical section of a detached portion of the rear thereof.

Similar letters of reference indicate corresponding parts in the several figures.

My invention consists of a T-frame carrying the driving, propelling, and steering wheels, and provided with angular metallic bracings, whereby it possesses the necessary strength.

It also consists of braces guiding the steering-stirrups, and preventing the feet striking the propeller-wheel.

It also consists of the combination of a cone-pulley driving-wheel, propelling-wheel with differential pulleys, a rigid frame, suspended stirrups, and steering-wheels, forming an improvement in land-propellers.

Referring to the drawings, A represents a frame consisting of the reaches $a$ and front uprights, $b$, rigidly connected in T form.

To the upper end of the uprights $b$ is mounted the driving-wheel B, consisting of or formed with a cone-pulley, $c$, whose shaft is provided with crank-handles $d$ for rotating the wheel.

On the lower end of the upright $b$ is mounted the propeller-wheel C, consisting of a wheel with differential pulleys $e$, which are located on opposite sides of the wheel in order to keep the same in the center of the upright portion of the frame.

By means of a belt, chain, or band, $f$, power is communicated from the driving-wheel to the propeller-wheel, the rider occupying the seat $g$, which is properly secured to the reaches $a$.

From the reaches there is suspended on each side in front of the seat $g$ a pivoted stirrup, D, to which is connected an arm, $h$, pivoted to the hind axle, E, which is pivoted to the rear of the frame, as at $a'$, whereby the hind wheels, E', are adapted for steering the propeller.

The operation is as follows: The rider occupies the seat $g$, grasps the crank-handles $d$, and places his feet in the stirrups D. By operating the handles $d$ rotation is imparted to the wheel B, the power whereof is communicated to the wheel C, and thus the vehicle is propelled. The steering is accomplished by properly moving the stirrups D, so that the hind axle turns on its pivot, and the wheels thereof assume the necessary angles for steering.

The cone-pulley $c$ and differential pulleys $e$ permit the belt or band $f$ to be shifted in order to vary the speed or power of the vehicle, owing to the grade or condition of the road, weight of the rider, and other circumstances, the propeller-wheel always occupying the middle of the upright portion of the frame.

In order to brace the T-frame, I secure to the reaches and uprights angular-shaped bars A', rods or bars A'', and rods or bars A''', the rods or bars A'' extending from the upper side of the reaches, and the rods or bars A''' extending from the lower side of the reaches.

By these means the frame A is greatly strengthened, and the connection of the reaches $a$ and uprights $b$ prevented from separation and breakage.

The rods or bars A''' are so disposed that the arms of the stirrups D bear against them. This guides the stirrups and prevents side play thereof, and also guards the feet of the rider from the propeller-wheel C.

F represents a brake, which is pivoted to the frame A, and so arranged in relation to the wheel C that its handle is readily accessible from the seat $g$, whereby the brake-shoe may be forced by the rider against the wheel for stopping or checking the vehicle. The release of the brake may be accomplished by hand, or a spring or other mechanical means properly applied.

The rear of the frame A may be formed with a rack, $a''$, for purposes of carrying articles or attachment of another seat.

Having thus described my invention, what I claim as new, and desire to secure by Letters Patent, is—

1. The T-frame A *a b*, provided with the angular metallic bracing-bars A', substantially as and for the purpose set forth.

2. The T-frame A *a b*, provided with bracings A' A'' A''', substantially as and for the purpose set forth.

3. The frame A, provided with guide and guard-bracings A''', in combination with the suspended stirrups D, substantially as and for the purpose set forth.

4. The cone-pulley driving-wheel B, propelling-wheel C, with pulleys *e e*, rigid T-frame, angular braces A', suspended stirrups D, and hind steering-wheels, E', constructed, combined, and operating as described, and forming an improvement in land-propellers.

H. W. BALTZ, Sr.

Witnesses:
JOHN A. WIEDERSHEIM,
SAML. M. GRICE.